United States Patent
Bottemiller et al.

(10) Patent No.: US 7,089,396 B2
(45) Date of Patent: Aug. 8, 2006

(54) METHOD AND PROFILING CACHE FOR MANAGEMENT OF VIRTUAL MEMORY

(75) Inventors: Kraig Allan Bottemiller, Rochester, MN (US); Brent William Jacobs, Rochester, MN (US); James A. Pieterick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 10/268,474

(22) Filed: Oct. 10, 2002

(65) Prior Publication Data

US 2004/0073768 A1    Apr. 15, 2004

(51) Int. Cl.
  *G06F 12/00* (2006.01)
(52) U.S. Cl. ............... 711/207; 711/202; 711/206; 711/200; 711/203; 711/159; 711/160; 711/128; 711/133; 711/108
(58) Field of Classification Search ............... 711/202, 711/206

See application file for complete search history.

(56) References Cited

U.S. PATENT DOCUMENTS

| 5,542,062 | A  | * | 7/1996 | Taylor et al. .................. 711/3 |
| 5,940,872 | A  | * | 8/1999 | Hammond et al. ......... 711/207 |
| 6,125,433 | A  | * | 9/2000 | Horstmann et al. ......... 711/160 |
| 6,205,531 | B1 | * | 3/2001 | Hussain ..................... 711/207 |
| 6,418,521 | B1 | * | 7/2002 | Mathews et al. ........... 711/207 |
| 6,715,039 | B1 | * | 3/2004 | Michael et al. ............. 711/133 |

* cited by examiner

*Primary Examiner*—Matthew Kim
*Assistant Examiner*—Zhuo H. Li
(74) *Attorney, Agent, or Firm*—Joan Pennington

(57) ABSTRACT

A method and profiling cache for management of virtual memory includes a set of entries stored in the profiling cache. Each entry of the set of entries includes a page address, a time stamp for the page address and a least recently used (LRU) count; and the LRU count is updated for each access of the page address. Entries in the profiling cache are cast out using the LRU counts. A translation lookaside buffer (TLB) includes a first TLB section for storing a plurality of temporarily pinned entries and a second TLB section for storing a plurality of non-pinned entries. Responsive to a TLB interrupt, an entry is loaded in the second TLB section using a first in first out algorithm for replacing the non-pinned entries. The first TLB portion is periodically updated utilizing identified ones of the set of entries in the profiling cache having oldest time stamps.

15 Claims, 4 Drawing Sheets

METHOD AND PROFILING CACHE FOR MANAGEMENT OF VIRTUAL MEMORY

FIELD OF THE INVENTION

The present invention relates generally to the data processing field, and more particularly, relates to a method and profiling cache for management of virtual memory.

DESCRIPTION OF THE RELATED ART

In order to reduce data access time, special purpose high-speed memory spaces of static random access memory (RAM) called a cache are used to temporarily store data which are currently in use. For example, the cached data can include a copy of instructions and/or data obtained from main storage for quick access by a processor. A processor cache typically is positioned near or integral with the processor. Data stored in the cache advantageously may be accessed by the processor in only one processor cycle retrieving the data necessary to continue processing; rather than having to stall and wait for the retrieval of data from a secondary memory, such as a higher level cache memory or main memory.

A program references storage using an effective address computed by the processor when it executes a load, store, branch, or cache instruction, and when it fetches the next sequential instruction. The effective address is translated to a real address according to predefined translation procedures. To minimize address translation time, a specialized cache dedicated to address translation called a translation lookaside buffer (TLB) typically is used for address translations.

In some known processor designs, page descriptions, or page table entries (PTEs), are stored in a translation look aside buffer (TLB). When an access is made to a page that is not in the TLB, an interrupt is generated and firmware must load the page table entry into the TLB.

With some known hardware, firmware has no way to tell which pages are frequently used. Page descriptions typically are loaded and replaced using a first in first out algorithm.

A need exists for an improved mechanism for management of virtual memory.

SUMMARY OF THE INVENTION

A principal object of the present invention is to provide a method and profiling cache for management of virtual memory. Other important objects of the present invention are to provide such a method and profiling cache for management of virtual memory substantially without negative effect and that overcome many of the disadvantages of prior art arrangements.

In brief, a method and profiling cache are provided for management of virtual memory. A set of entries is stored in the profiling cache. Each entry of the set of entries includes a page address, a time stamp for the page address, and a least recently used (LRU) count. The LRU count is updated for each access of the page address. Entries in the profiling cache are cast out using the stored LRU counts. A translation lookaside buffer (TLB) includes a first TLB section for storing a plurality of temporarily pinned entries and a second TLB section for storing a plurality of non-pinned entries. Responsive to a TLB interrupt, an entry is loaded in the second TLB section using a first in first out algorithm for replacing one of the non-pinned entries. The first TLB portion is periodically updated utilizing identified ones of the set of entries in the profiling cache having oldest time stamps.

In accordance with features of the invention, the profiling cache hardware provides memory profiling information for efficient memory management. The profiling cache entries having the oldest time stamps represent the most frequently used pages. When a downward counter expires, the first TLB portion is updated, then the profiling cache is cleared and the downward counter is restarted.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
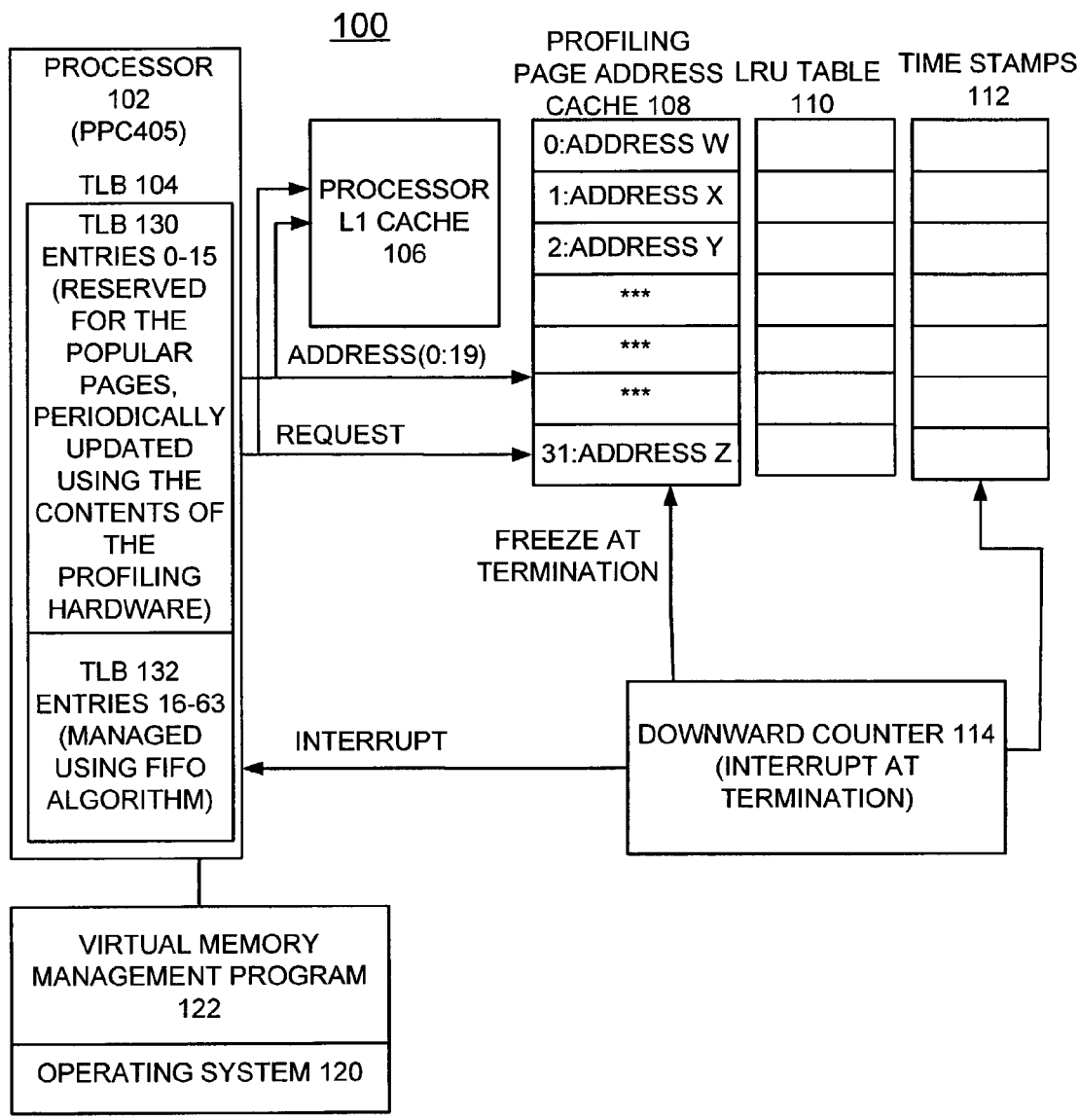
FIG. 1 is a block diagram representation of a computer system in accordance with the preferred embodiment.

Having reference now to the drawings, in FIG. 1, there is shown a computer system for implementing virtual memory management of the preferred embodiment generally designated by the reference character 100. Computer system 100 includes a processor 102 and a translation lookaside buffer (TLB) 104. Computer system 100 includes a processor L1 cache 106, and a profiling page address cache 108 that includes a least recently used (LRU) table 110 and a timestamp table 112. Computer system 100 includes a downward counter 114. When the downward counter 114 reaches zero, it generates an interrupt to the processor 102, and signals the profiling page address cache 108 to freeze. Computer system 100 includes an operating system 120 and a virtual memory management program 122 of the preferred embodiment. Computer system 100 is shown in simplified form sufficient for understanding the invention. It should be understood that the present invention is not limited to use with the illustrated computer model, for example, with a single CPU as shown in FIG. 1.

In accordance with features of the invention, the operating system 120 is enabled to determine which pages should be temporarily pinned in the TLB 104 without requiring excessive firmware overhead. The hardware portion of the invention or profiling cache 108 monitors the processor bus at the L1 cache interface 106 and tracks the most accessed pages for efficient memory management. The page table entries (PTEs) to be temporarily pinned in the TLB 104 are identified based upon those most frequently used pages stored in the profiling cache 108.

In accordance with features of the invention, the TLB 104 is split into two parts or sections 130 and 132. The entries of TLB 104 in the first TLB section 130 are used for highly accessed pages and are periodically evaluated. The PTEs are temporarily pinned in the first TLB section 130. The second TLB section 132 of the TLB 104 containing the remaining entries is managed as a FIFO, for low firmware overhead, these pages are considered to be non-pinned. When a TLB interrupt is received, only entries in the non-pinned portion 132 will be replaced. PTEs in the temporarily pinned area are periodically replaced in accordance with the preferred embodiment as illustrated and described with respect to FIGS. 2 and 3.

In accordance with features of the invention, a set number of addresses are stored in the page address cache 108 that uses the least recently used (LRU) algorithm to cast out entries, since it is not practical to count the accesses to each page. The cache size, for example, 32 addresses of the profiling page address cache 108 is based on practical limits for ASIC hardware cell count and performance. The profiling is based on the assumption that the most consistently accessed pages will not be cast out of the cache 108. A cache size of 32 for the page address cache 108 with only 16 pages used for the pinned portion 130 of the TLB 104 as shown in FIG. 1 allows noise to be filtered out by the LRU behavior of the cache 108.

When an entry is first put into the page address cache 108, a time value is saved in the timestamp table 112, the LRU count in the LRU table 110 is updated on every access. Entries 0–31 that last the longest (oldest time stamp) in the cache 108 with LRU are the most frequently accessed pages. If a page is evicted and then brought back into the cache 108 then a new time stamp 112 is assigned to that page. When the countdown timer 114 expires firmware invalidates all entries in the TLB 104, or entries in the second TLB section 132 as they are moved to the first TLB section 130. Then the PTEs mapping the 16 pages with the oldest time stamps are loaded into the first section 130 of the TLB reserved for temporarily pinned pages. The time a page has spent in the cache 108 at this point indicates frequency of use and the importance of pinning this page in the pinned section 130 of the TLB 104. Once the new entries have been pinned, then the cache 108 is cleared and the count down timer 114 is restarted.

Figure 2:
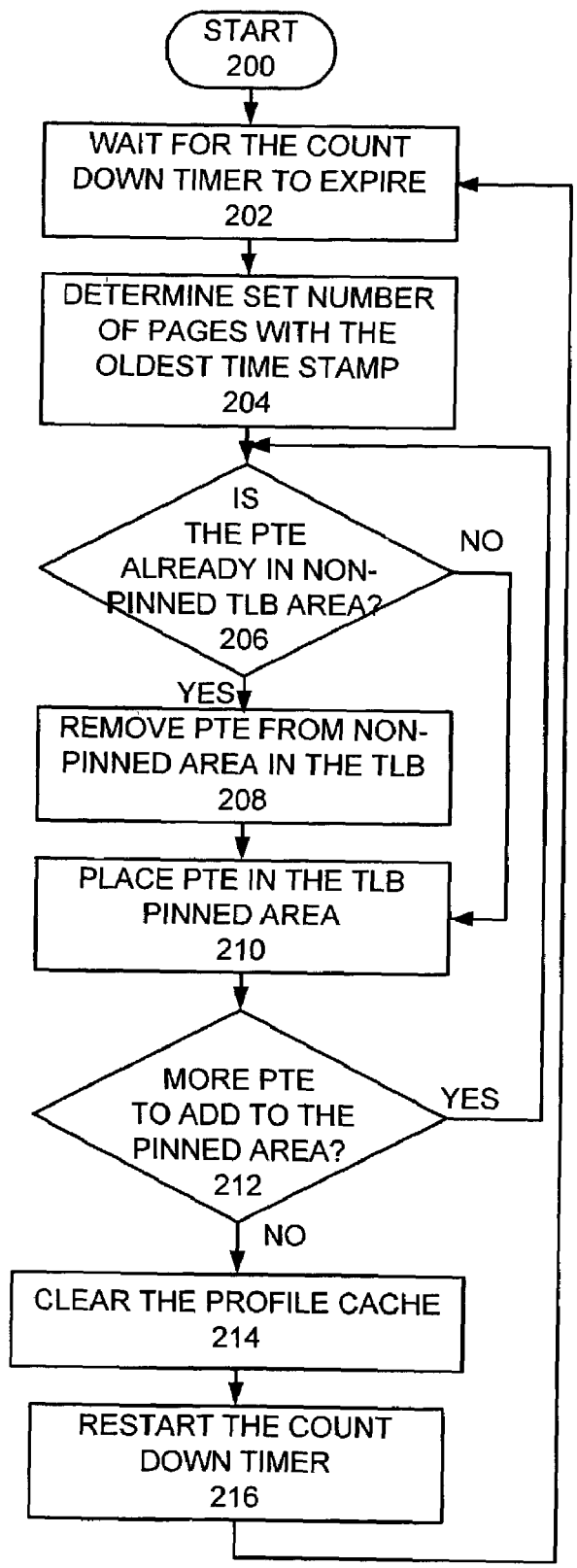
FIG. 2 is a flow chart illustrating exemplary sequential steps for updating a temporarily pinned portion of a translation lookaside buffer of FIG. 1 in accordance with the preferred embodiment.

Referring to FIG. 2, there are shown exemplary sequential steps for periodically updating the temporarily pinned section 130 of the translation lookaside buffer (TLB) 104 in accordance with the preferred embodiment starting at block 200. First waiting for the countdown timer 114 to expire is performed as indicated in a block 202.

Figure 3:
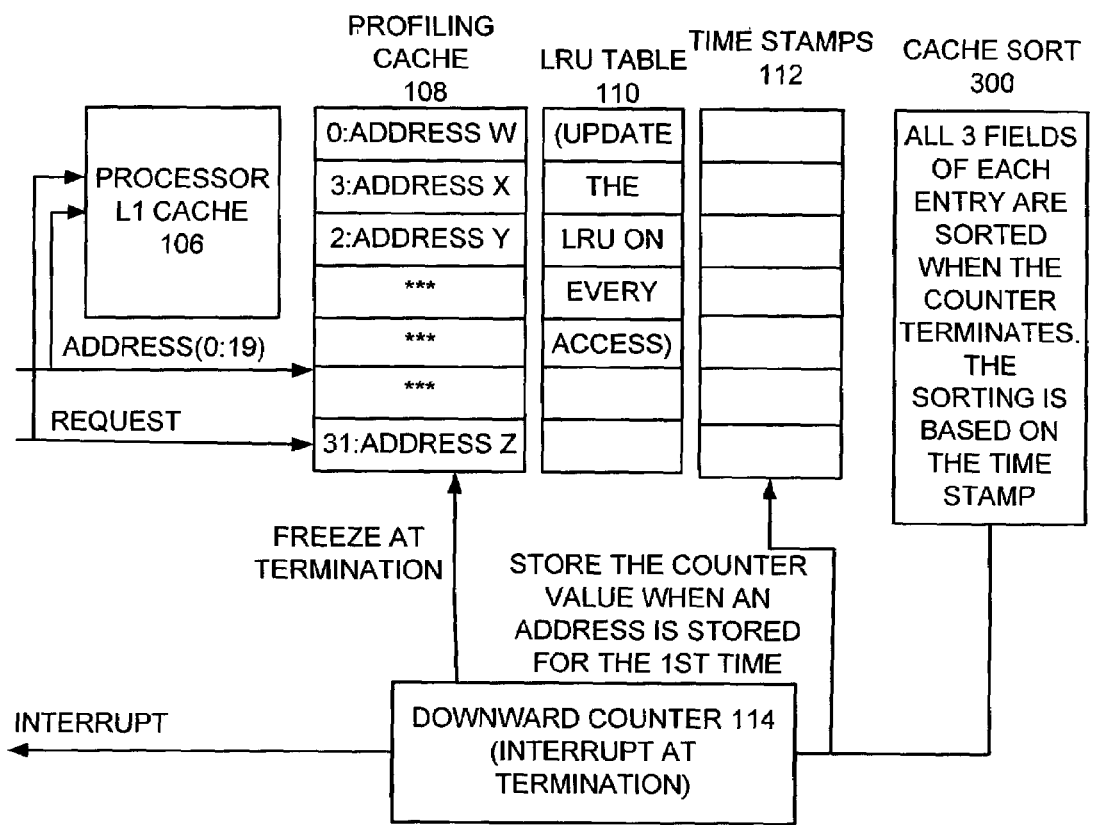
FIG. 3 is a schematic and logical flow diagram illustrating updating hardware for implementing the temporarily pinned portion of the translation lookaside buffer in accordance with the preferred embodiment.

Referring also to FIG. 3, when an access is made to a page that is not in the TLB 104, an interrupt is generated to the operating system 120, which finds the appropriate page table entry. The page table entry is loaded into the non-pinned section 132 of the TLB based upon the first in first out (FIFO) algorithm. The profiling page address cache 108 stores the address of the page. A counter value is stored in the time stamp table 112 when an address is stored for the first time in the page address cache 108. The profiling cache 108 includes the LRU field 110 that is updated on every access to a particular page address. The LRU algorithm is used to cast out entries from the profiling page address cache 108. When the downward counter 114 has expired, a cache sort function 300 is performed for all three fields: address 108, LRU 110 and time stamp 112. The cache sorting function 300 is based on the time stamp 112 of each stored page address. The address 108 illustrates sorted addresses in FIG. 3.

When the downward counter 114 has expired, a set number of pages with the oldest time stamps stored in the time stamp table 112 is identified as indicated in a block 204 in FIG. 2.

For each of the pages identified at block 204, checking whether the PTE mapping the page is already in the non-pinned portion 132 of the TLB 104 is performed as indicated in a decision block 206. If the PTE is already in the non-pinned portion 132 of the TLB 104, then the PTE is removed from the non-pinned portion 132 of the TLB 104 as indicated in a block 208. Then the PTE is placed in the pinned portion 130 of the TLB 104 as indicated in a block 210. Checking for more PTEs to add to the pinned area 130 of the TLB 104 is performed as indicated in a decision block 212. When more PTEs are to be added to the pinned area 130 of the TLB 104, then the sequential steps return to block 206, to check whether the PTE is already in the non-pinned portion 132 of the TLB 104. When no more PTEs are to be added to the pinned area 130 of the TLB 104, then the profile cache 108 is cleared as indicated in a block 214. Then the downward counter 114 is restarted as indicated in a block 216. TLB entries of the non-pinned section 132 remain present until moved to the pinned section 130 of the TLB 104 or until cast out through the normal FIFO or round robin replacement algorithm. Then the sequential operations return to block 202 to wait for the downward counter 114 to expire.

It should be understood that alternative steps could be performed in accordance with the invention. For example, an alternative replacing steps 206, 208, 210, and 212, all the page entries in the pinned section 130 and remaining area 132 of the TLB 104 can be cleared and then the PTEs representing the pages with the oldest time stamps in the profile cache 108 are placed in the pinned section 130 of the TLB 104 and the non-pinned section 132 of the TLB 104 remains clear until repopulated as misses occur.

The prior art solution of counting misses places equal priority on pages with bursty traffic and pages that are consistently accessed. Counting misses only tells you how often a page missed in the TLB and not how often firmware is accessing a particular page. A TLB miss can be generated for a single access to a page, this single access does not make a page important. The profiling cache method of the preferred embodiment enables effective memory management with the PTEs of highly accessed pages being temporarily pinned in the first section 130 of the TLB 104.

Figure 4:
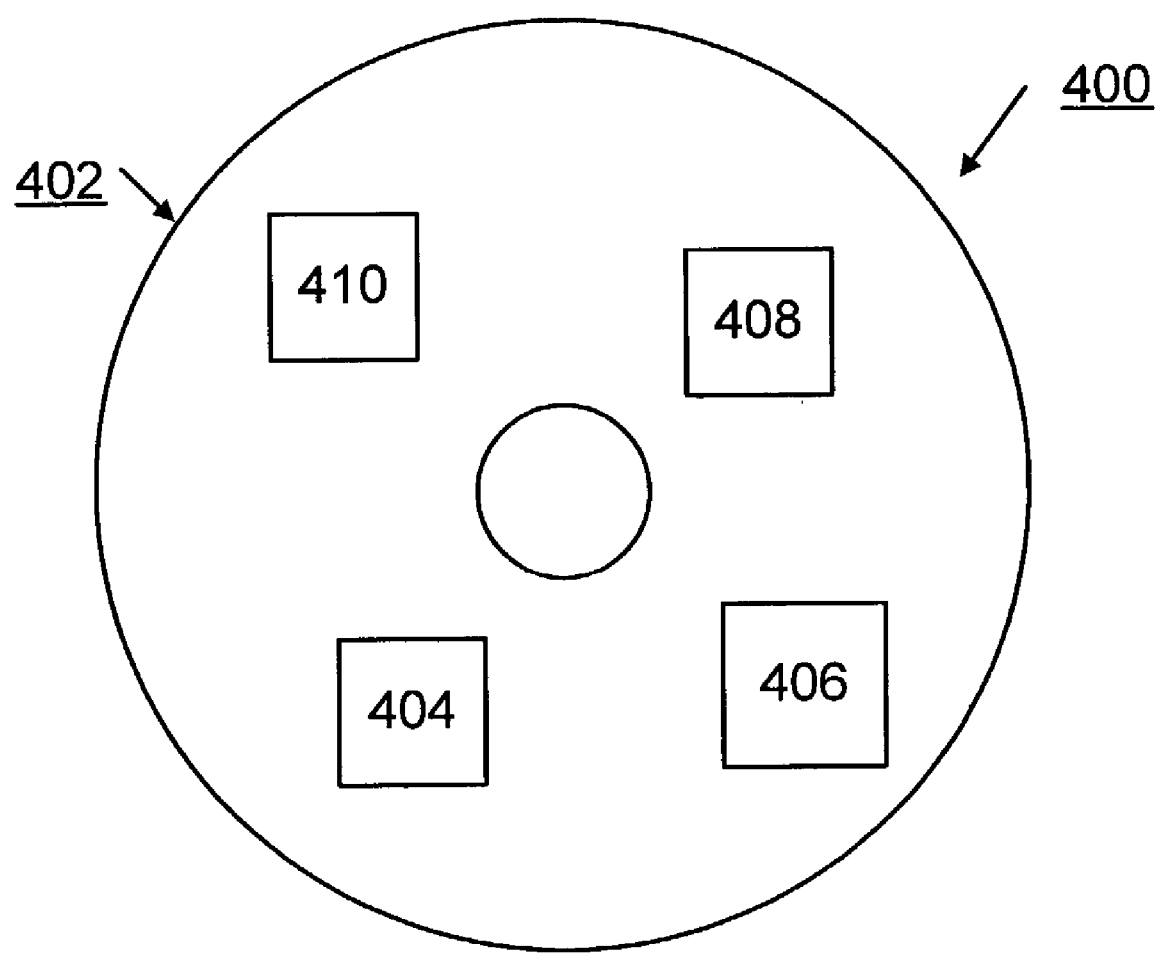
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing virtual memory management of the preferred embodiment in the system 100 of FIG. 1.

A sequence of program instructions or a logical assembly of one or more interrelated modules defined by the recorded program means 404, 406, 408, 410, direct the computer system 100 for implementing virtual memory management of the preferred embodiment.

While the present invention has been described with reference to the details of the embodiments of the invention shown in the drawing, these details are not intended to limit the scope of the invention as claimed in the appended claims.

What is claimed is:

1. A method using a profiling cache for management of virtual memory comprising the steps of:

storing a set of entries in the profiling cache, each entry of said set of entries including a page address, a time stamp for said page address, and a least recently used (LRU) count; said LRU count being updated for each access of said page address;

casting out entries in the profiling cache using said LRU counts;

providing a translation lookaside buffer (TLB) including a first TLB section for storing a plurality of temporarily pinned entries and a second TLB section for storing a plurality of non-pinned entries;

responsive to a TLB interrupt, loading an entry in said second TLB section using a first in first out algorithm for replacing one of said non-pinned entries;

periodically updating said first TLB section utilizing identified ones of said set of entries in the profiling cache having oldest time stamps including the steps of identifying an entry within said second TLB section included in said identified profiling cache entries having oldest time stamps, removing said entry from said second TLB section, and placing said entry in said first TLB section.

2. A method as recited in claim 1 wherein said identified ones of said set of entries in the profiling cache having oldest time stamps represent most frequently used page table entries.

3. A method as recited in claim 1 wherein the step of periodically updating said first TLB section includes the steps of identifying an expired countdown counter, updating said first TLB section, clearing the profiling cache, and restarting the downward counter.

4. A method as recited claim 1 wherein the step of storing said set of entries in the profiling cache includes the steps of storing thirty-two entries in the profiling cache.

5. A method as recited in claim 1 wherein the step of providing said translation lookaside buffer (TLB) including said first TLB section for storing said plurality of temporarily pinned entries and said second TLB section for storing said plurality of non-pinned entries includes the step of providing said first TLB section for storing sixteen temporarily pinned entries.

6. A method as recited in claim 5 includes the step of providing said second TLB section for storing at least thirty-two non-pinned entries.

7. A method as recited in claim 1 includes the step of clearing said plurality of non-pinned entries in said second TLB section responsive to updating said first TLB section.

8. Apparatus for management of virtual memory comprising:

a translation lookaside buffer (TLB); said TLB including a first TLB section for storing a plurality of temporarily pinned entries and a second TLB section for storing a plurality of non-pinned entries;

a profiling cache for storing a set of entries, each entry of said set of entries including a page address, a time stamp for said page address, and a least recently used (LRU) count; said LRU count being updated for each access of said page address; and a virtual memory management program for periodically updating said first TLB section utilizing identified ones of said set of entries in said profiling cache having oldest time stamps including identifying an entry within said second TLB section included in said identified profiling cache entries having oldest time stamps, removing said entry from said second TLB section, and placing said entry in said first TLB section.

9. Apparatus for management of virtual memory as recited in claim 8 wherein said second TLB section for storing said plurality of non-pinned entries is updated using a first in first out (FIFO) algorithm.

10. Apparatus for management of virtual memory as recited in claim 8 wherein said profiling cache is updated using said least recently used (LRU) counts.

11. Apparatus for management of virtual memory as recited in claim 8 wherein said profiling cache stores said set of thirty-two entries.

12. Apparatus for management of virtual memory as recited in claim 8 wherein said first TLB section for storing sixteen temporarily pinned entries.

13. Apparatus for management of virtual memory as recited in claim 8 wherein said second TLB section for storing at least thirty-two non-pinned entries.

14. Apparatus for management of virtual memory as recited in claim 8 wherein an entry is loaded in said second TLB section responsive to a TLB interrupt.

15. Apparatus for management of virtual memory as recited in claim 14 wherein a first in first out algorithm is used for replacing one of said non-pinned entries for loading said entry.

* * * * *